(12) United States Patent
Junker et al.

(10) Patent No.: US 11,273,975 B2
(45) Date of Patent: Mar. 15, 2022

(54) CAPSULE FOR PREPARING A BEVERAGE

(71) Applicant: NOOTRIE AG, Pfäffikon (CH)

(72) Inventors: Daniel Junker, Glattpark (CH); Karin Ettlin, Glattpark (CH); Fabian Volkart, Glattpark (CH)

(73) Assignee: NOOTRIE AG, Pfaeffikon (CH)

( * ) Notice: Subject to any disclaimer, the term of this patent is extended or adjusted under 35 U.S.C. 154(b) by 225 days.

(21) Appl. No.: 16/291,816

(22) Filed: Mar. 4, 2019

(65) Prior Publication Data
US 2019/0270581 A1  Sep. 5, 2019

(30) Foreign Application Priority Data
Mar. 5, 2018 (EP) ..................... 18159995

(51) Int. Cl.
*B65D 85/80* (2006.01)
*B01F 7/00* (2006.01)
*B65D 85/804* (2006.01)
*A47J 31/40* (2006.01)
*B01F 3/12* (2006.01)

(52) U.S. Cl.
CPC ........ *B65D 85/8055* (2020.05); *A47J 31/407* (2013.01); *B01F 3/1221* (2013.01); *B01F 7/00291* (2013.01); *B65D 85/8046* (2013.01); *B65D 85/8061* (2020.05); *B01F 2215/0022* (2013.01)

(58) Field of Classification Search
CPC .............. B65D 85/8043; B65D 85/804; B65D 85/8046; B01F 3/1221; B01F 7/00291; B01F 7/003; B01F 7/00308; B01F 7/00316; B01F 7/00008; B01F 7/00233; B01F 7/0025; B01F 7/00258; B01F 7/00266; B01F 7/00275; B01F 7/00283; B01F 7/00325; B01F 7/00333; A47J 31/407; A23G 9/12; A23G 9/224; A23G 19/224; A23G 9/106
See application file for complete search history.

(56) References Cited

U.S. PATENT DOCUMENTS

| | | | |
|---|---|---|---|
| 7,100,496 B2 | 9/2006 | Majer Doglioni | |
| 7,607,549 B2 | 10/2009 | Morini | |
| 8,875,617 B2 | 11/2014 | Favre | |
| 8,960,999 B1 | 2/2015 | Ochoa et al. | |
| 9,242,791 B2 | 1/2016 | Denisart et al. | |
| 9,376,253 B2 | 6/2016 | Ayoub | |
| 9,399,547 B2 | 7/2016 | Bartoli et al. | |

(Continued)

FOREIGN PATENT DOCUMENTS

| | | |
|---|---|---|
| CN | 201987311 U | 9/2011 |
| EP | 2489609 A1 | 8/2012 |

(Continued)

*Primary Examiner* — Ericson M Lachica
(74) *Attorney, Agent, or Firm* — Mannava & Kang, P.C.

(57) ABSTRACT

A capsule for preparing a beverage comprises a housing with an outlet, and a cavity for containing a powder, an inner membrane between the cavity and the outlet, an agitator, comprising a central shaft, and at least one blade attached to the central shaft. The at least one blade comprises at least one blade element for one or more of piercing and cutting the inner membrane. Further aspects of the invention are an apparatus and a method for preparing a beverage.

19 Claims, 2 Drawing Sheets

(56) References Cited

U.S. PATENT DOCUMENTS

| | | |
|---|---|---|
| 9,504,974 B2 | 11/2016 | Ochoa et al. |
| 9,675,203 B2 | 6/2017 | Roberts et al. |
| 9,764,891 B1* | 9/2017 | Aviles ............... B65D 85/8043 |
| 9,878,843 B2 | 1/2018 | Nabeiro et al. |
| 9,993,108 B2 | 6/2018 | Dogan et al. |
| 10,426,180 B1* | 10/2019 | Fonte ..................... A23G 9/28 |
| 2004/0145966 A1* | 7/2004 | Kar ...................... B01F 3/1221 |
| | | 366/329.1 |
| 2006/0225575 A1 | 10/2006 | Denisart et al. |
| 2007/0144355 A1 | 6/2007 | Denisart et al. |
| 2008/0041236 A1 | 2/2008 | Raouf et al. |
| 2008/0216666 A1* | 9/2008 | Doglioni Majer . B65D 85/8043 |
| | | 99/295 |
| 2008/0317931 A1* | 12/2008 | Mandralis ................ A23F 5/24 |
| | | 426/594 |
| 2009/0223386 A1* | 9/2009 | Edwards .................. B01F 7/32 |
| | | 99/455 |
| 2010/0212507 A1 | 8/2010 | Hester et al. |
| 2010/0303964 A1* | 12/2010 | Beaulieu ............ B65D 85/8043 |
| | | 426/77 |
| 2010/0307930 A1 | 12/2010 | Zangerle |
| 2011/0045144 A1 | 2/2011 | Boussemart et al. |
| 2011/0110180 A1 | 5/2011 | Snider et al. |
| 2012/0096876 A1 | 4/2012 | Ravji et al. |
| 2012/0251668 A1* | 10/2012 | Wong ................... A47J 31/0673 |
| | | 426/77 |
| 2012/0308688 A1 | 12/2012 | Peterson et al. |
| 2013/0216663 A1 | 8/2013 | Dogan et al. |
| 2013/0236609 A1 | 9/2013 | Magniet et al. |
| 2013/0259982 A1* | 10/2013 | Abegglen .......... B65D 85/8043 |
| | | 426/115 |
| 2013/0323371 A1 | 12/2013 | Kutcher et al. |
| 2014/0026761 A1 | 1/2014 | Bartoli et al. |
| 2014/0123859 A1 | 5/2014 | Verbeek |
| 2014/0165846 A1 | 6/2014 | Ochoa et al. |
| 2014/0328983 A1 | 11/2014 | Jarisch et al. |
| 2014/0342067 A1* | 11/2014 | Sullivan .............. A47J 31/3633 |
| | | 426/425 |
| 2015/0017288 A1 | 1/2015 | Lo Faro et al. |
| 2015/0056343 A1 | 2/2015 | Mori et al. |
| 2015/0071025 A1 | 3/2015 | Herbert |
| 2015/0135965 A1 | 5/2015 | Lo Faro et al. |
| 2015/0203285 A1* | 7/2015 | Baldo ................ B65D 81/3211 |
| | | 426/112 |
| 2015/0329282 A1* | 11/2015 | Bartoli ............... B01F 15/0254 |
| | | 426/115 |
| 2015/0368033 A1 | 12/2015 | Krug et al. |
| 2016/0137402 A1 | 5/2016 | Talon et al. |
| 2016/0145037 A1* | 5/2016 | Trombley .............. A61K 45/06 |
| | | 206/438 |
| 2016/0174754 A1 | 6/2016 | Flick et al. |
| 2016/0214787 A1 | 7/2016 | Iotti et al. |
| 2016/0244237 A1* | 8/2016 | Hentzel ................... B65D 3/24 |
| 2016/0244248 A1 | 8/2016 | Corker et al. |
| 2016/0345769 A1 | 12/2016 | Clausen et al. |
| 2016/0362246 A1* | 12/2016 | Garcin ................ A47J 31/407 |
| 2017/0055761 A1 | 3/2017 | Roberts et al. |
| 2017/0240400 A1 | 8/2017 | Pellaud et al. |
| 2017/0258264 A1 | 9/2017 | Holten et al. |
| 2017/0332844 A1* | 11/2017 | Behar ............... B01F 15/00538 |
| 2017/0355515 A1* | 12/2017 | Marcinkowski ........ B65B 29/02 |
| 2018/0169599 A1* | 6/2018 | Ahmad ............... B01F 7/00733 |
| 2019/0016527 A1 | 1/2019 | Doglioni et al. |
| 2019/0069725 A1* | 3/2019 | Wang ................... A47J 43/0722 |
| 2019/0084757 A1 | 3/2019 | Brysch et al. |
| 2019/0357564 A1* | 11/2019 | Yang ....................... A23G 9/12 |
| 2019/0374067 A1* | 12/2019 | Duffy ................ B01F 15/0234 |

FOREIGN PATENT DOCUMENTS

| | | | |
|---|---|---|---|
| EP | 2537779 A1 | 12/2012 | |
| EP | 2757055 A1 | 7/2014 | |
| GB | 1256247 A | 12/1971 | |
| WO | 2004/078009 A2 | 9/2004 | |
| WO | 2011/035942 A1 | 3/2011 | |
| WO | 2012/064885 A1 | 5/2012 | |
| WO | 2012/174331 A1 | 12/2012 | |
| WO | 2013/130576 A1 | 9/2013 | |
| WO | WO-2015170358 A2 * | 11/2015 | ............ B65D 25/02 |
| WO | 2017/123751 A1 | 7/2017 | |

* cited by examiner

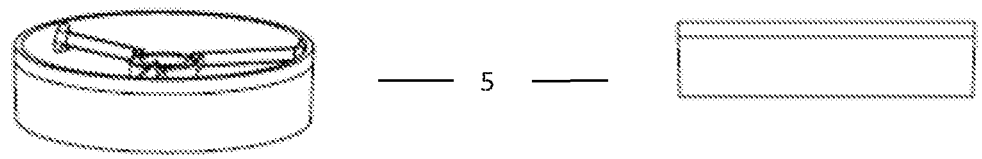
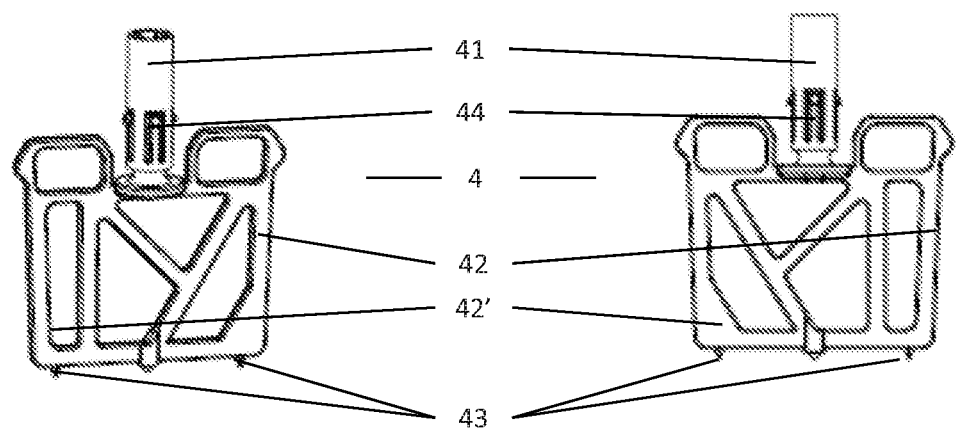
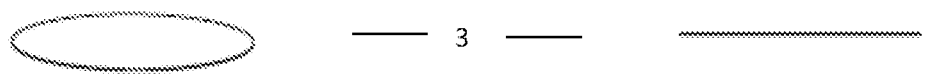
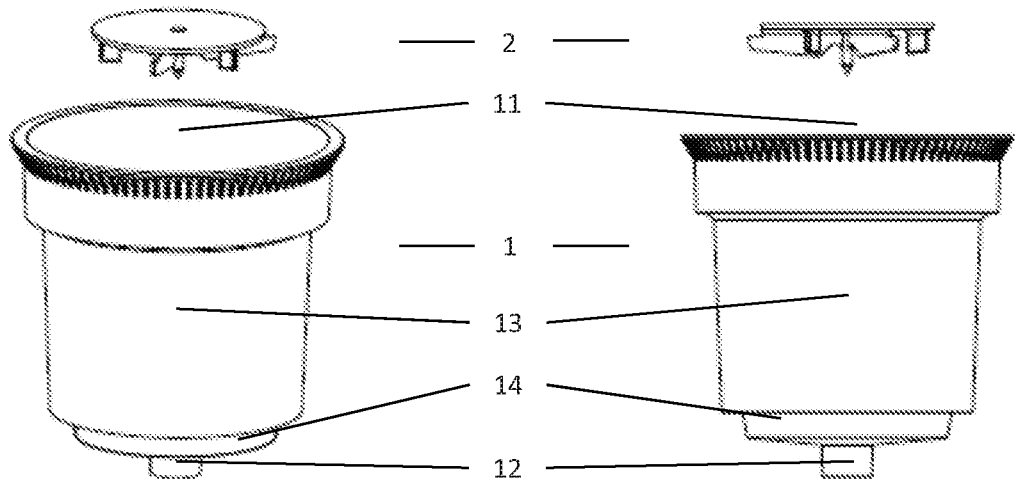
FIG. 1  FIG. 2

CAPSULE FOR PREPARING A BEVERAGE

TECHNICAL FIELD

The present invention relates to a capsule for preparing a beverage. Further aspects of the invention concern an apparatus and a method for preparing a beverage.

BACKGROUND ART

Conventional ways of preparing beverages from powders, such as sports drinks, energy drinks, soups, or baby formula, are delicate since they require significant amounts of time and attention to measure a right quantity of powder, to transfer the powder to a glass or bottle without spilling, to mix the powder sufficiently with water, and to clean any equipment used. Moreover quality and solubility of the powder usually decrease with a time a powder container has been open for. Hence the conventional preparation of beverages from powder is on the one hand inconvenient, and on the other hand, it rarely yields desirable results in terms of a homogeneous solution of the powder in water.

Existing improvements comprise prepackaged portions of powder in bags or capsules. However, some drawbacks persist, in particular undesired spilling, cleaning, and reaching a homogeneous mixture.

It is desired that the preparation of a beverage from powder is easy and quick, and that it yields a homogeneous solution and an appetizing drink, respectively.

DISCLOSURE OF THE INVENTION

The problem to be solved by the present invention is to provide a capsule and a method for preparing a beverage, which overcomes the disadvantages and limitations of the conventional ways of preparing of a beverage from powder.

The problem is solved by a capsule for preparing a beverage, comprising a housing with an outlet, and a cavity for containing a powder, an inner membrane between the cavity and the outlet, an agitator, comprising a central shaft, and at least one blade attached to the central shaft. The at least one blade comprises at least one blade element for piercing and/or cutting the inner membrane.

In different embodiments, the capsule may be a container of cylindrical or conical or cuboid or mixed outer shape. The housing may be manufactured as one part, or composed of several parts. Beverages may be, but are not restricted to sports drinks, energy drinks, soups, or baby formula. Powders for preparing the beverage comprise all kinds of granular matter. In other embodiments, the powder may be on hand as a solution, a viscous fluid or a gel.

The capsule comprises an inner membrane between the cavity and the outlet for sealing any powder contained in the cavity in a first state, in which the inner membrane is intact, i.e. the outlet is closed against the cavity. The inner membrane may prevent air contact of the powder in the first state, or it may result in a vacuum pack of the powder, such that properties of the powder for storage are improved, and taste and quality are preserved. In different embodiments, the cavity may contain the powder and air, or may contain the powder and a different gas. Preferably, the inner membrane is arranged inside the capsule at an axial level of the capsule different from the axial level of the outlet. Hence, it is preferred that the outlet itself is not sealed, but the outlet is sealed against the cavity by means of the inner membrane being arranged in the capsule offset from the outlet.

The agitator may comprise one or several blades attached to the central shaft, including the one or several blades and the central shaft being formed as one piece The central shaft is in particular used to contact the agitator from outside the capsule, e.g. by a motor shaft of a corresponding apparatus for preparing beverages. For that purpose, the central shaft may comprise coupling means for reversible attachment to the motor shaft. The central shaft may have a length corresponding to an inner height of the cavity, or it may in particular have a length smaller than the inner height of the cavity.

A blade of the agitator shall be defined as a laminar element, which extends predominantly vertically, i.e. axially along the central shaft, and radially outward from the central shaft. A blade may be a continuous laminar element, or it may in particular be made of a lattice structure, e.g. a frame with bars reaching from one side of the frame to a different side.

The blade element for piercing and/or cutting the inner membrane may be part of, or attached to the blade, alternatively. In a different embodiment it may be attached to any part of the agitator. The blade element may e.g. be a spike, a stud, or a knife, configured to pierce and/or cut the inner membrane, when pushed onto, or dragged along the latter.

When rotated, the agitator mixes or stirs the powder in the cavity. In particular, it is used for premixing the powder with any supplied water in a first state while the inner membrane still is intact. The agitator may also be used to pierce and/or cut the inner membrane, transferring the capsule to a second state, in which a mixture of water and powder may pour from the cavity through the piercings or the slots in the inner membrane to the outlet, and finally out of the outlet. The piercing or cutting may be effected by an axial movement of the agitator, which may be accompanied by a rotation of the agitator. As a result, the mixture of powder and water may flow out of the capsule via the outlet, while the agitator may be used to mix the remaining powder with more water. In this way, a good mixture and a homogeneous solution of powder and water is achieved. Moreover, rotating the agitator makes a high flow rate feasible as well as a high degree of drainage of the capsule, resulting in a good recovery rate and less wasted powder, and causing less spilling when discarding the capsule.

To further improve the mixing properties of the agitator, it may preferably comprise at least two blades which differ from each other in shape. In an embodiment, two blades may be arranged on opposite sides of the central shaft, i.e. with an angular offset of 180°. In particular the at least two blades may have differing lattice structures, forming an asymmetric agitator. Such asymmetry has the effect that the frame and the bars of the blades run along different trajectories, when the agitator is rotated, thus creating multiple pathways in the mixture, resulting in a better wetting and mixing.

Preferably the capsule comprises a top membrane for sealing an inlet of the housing. The inlet may be an opening in the side of the housing situated opposite to the outlet. Preferably, the powder is filled into the cavity of the capsule through the inlet of the capsule prior to the inlet being sealed by the top membrane, e.g. at a manufacturing site. The side of the outlet is defined as the bottom side, the side of the inlet as the top side. The top membrane may be glued on the housing, and prevent any contact with air or liquid or any other contamination of the powder. When preparing the beverage, the top membrane may be pierced or cut or peeled off, in order to supply water into the capsule.

Further the capsule preferably comprises a bearing for the central shaft of the agitator. The bearing is configured to enable a shift of the agitator between an upper and a lower axial position. In particular a top end of the central shaft located next to the inlet is pivotable in the bearing. The bearing keeps the central shaft in place, especially when the capsule is transported, or when the agitator is rotated. Due to the possibility of axial shifting, the agitator can be used to open the outlet by cutting and/or piercing the inner membrane. In a different embodiment, the combination of agitator and bearing may be arranged and configured shiftable in axial direction, e.g. in form of a movement relative the housing of the capsule.

Hence, the agitator and the bearing for the agitator are arranged in the capsule, and preferably are arranged in the cavity of the capsule. Such capsule, when being distributed, may include the agitator, the bearing and the powder inside the cavity of the capsule. The cavity preferably is sealed by means of the inner membrane against the otherwise open outlet of the capsule, while the inlet of the capsule and hence the cavity is sealed by the top membrane.

Preferably the housing comprises another cavity between the inner membrane and the outlet. In that way, the inner membrane is not located directly at the outlet, and hence is protected against unwanted damaging. Moreover, the other cavity improves the mixing properties, and leads to a laminar outflow from the outlet.

Further the capsule preferably comprises an insert in the other cavity. The insert is configured to enable pivoting of a bottom end of the agitator located next to the outlet, when the agitator is in a lower axial position. Thus it stabilizes the rotation of the agitator, especially when the latter is cutting the inner membrane. In particular the insert is configured to prevent piercing of the inner membrane, when the agitator is in an upper axial position. Besides it further improves the mixing properties of the other cavity.

The cavity is preferably configured to contain at least 15 g of powder for preparing a beverage, in particular 25 to 50 g of powder, which is a typical amount for one portion or serving. The amount of powder in the capsule may vary depending on the type of beverage prepared. The amount of resulting beverage may typically be in a range between 2 and 3 dl, preferably 2.5 dl.

One or more of the housing, the agitator, the insert, and the bearing are preferably made of plastic or aluminium. The inner membrane and/or the top membrane are preferably a plastic foil or an aluminium foil. It is preferred that the materials preserve taste and quality of the powder during storage.

Preferably the capsule also comprises a bypass for water to flow through the capsule without coming into contact with the powder. The bypass may have a bypass inlet on the top side of the capsule for connecting to a water supply. The bypass bypasses the cavity with the powder, and it may comprise a bypass outlet at the bottom side of the capsule, which may coincide with the outlet of the capsule. The bypass facilitates leading an amount of pure water without powder into a drinking container, which can improve a resulting beverage in terms of mixing and appetizing appearance, in particular when applied before cutting the inner membrane.

In a different embodiment, instead of the bypass integrated into the capsule, the bypass may be provided as an element of the apparatus to be introduced below. Again, the bypass, e.g. in form of a tube, allows water from a water supply of the apparatus to pour directly into the drinking container without passing the capsule. Again preferably, such water supply may preferably be applied before the inner membrane is cut, for the very purposes as laid out above.

According to an aspect of the invention, the capsule is complemented with an apparatus for preparing a beverage. The apparatus comprises a capsule holder configured to receive a capsule as described above, a water supply configured to supply water to the capsule, a motor configured to drive the agitator of the capsule, and a control unit configured to control the water supply and the motor. In particular the water supply may comprise one or more injection needles configured to pierce the top membrane of the capsule and supply water into the cavity of the capsule.

In different embodiments, the capsule holder may be a drawer in which a user inserts the capsule and then closes the drawer, or it may be a receptacle which can be closed, e.g. through pressing a lever. Preferably an inner shape of the capsule holder fits an outer shape of the capsule.

The water supply may be fed by a water tank of the apparatus, or it may be fed via a connection with a water pipe. Preferably, the water supply comprises pumping and measuring means, and is controlled by the control unit, in order to supply a correct amount of water into the capsule. The motor may be an electric motor with speed and sense of rotation being controlled by the control unit.

Preferably the motor is configured to drive a motor shaft, which is configured to couple to the central shaft of the agitator. In an embodiment, the motor shaft may comprise coupling means for reversibly coupling to the central shaft of the agitator. The coupling may be achieved by a vertical movement of the motor shaft, e.g. by pressing a lever, which may be the lever mentioned above closing the capsule holder or lowering the injection needle at the same time.

The motor shaft, or the motor shaft and the motor are preferably shiftable in an axial direction between an upper and a lower axial position, and in particular the shift between the upper and the lower axial position is controlled by the control unit. In different embodiments, the axial shift is caused hydraulically or through an electric servo motor. In that way, the axial shift, being responsible for a piercing and/or cutting of the inner membrane, is performed in a precise and controlled manner.

Further the apparatus preferably comprises an indicator light and one or more control buttons and/or other I/O interface means such as a GUI. The indicator light may e.g. be an LED, indicating different operating states of the apparatus through different lighting patterns or colours. The control button is envisaged to be a one-button-control for the apparatus, enabling the performance of all required user interaction by touching or pressing this one button only. A performance of a desired action may e.g. depend on a duration of touching the button.

In case the capsule comprises a bypass, the apparatus preferably also contains a bypass water supply. The bypass water supply couples to the bypass inlet, when the capsule is inserted into the capsule holder. Also the bypass water supply is preferably controlled by the control unit.

According to another aspect of the invention, a method for preparing a beverage comprises the steps of (a) premixing a powder and water inside a cavity of a capsule, while an outlet of the capsule is sealed against the cavity by an inner membrane, (b) piercing and/or cutting the inner membrane previously sealing the outlet, and (c) mixing the powder and more water inside the capsule, when the outlet is accessible from the cavity, a resulting mixture flowing out from the outlet. This means steps (a) and (c) are conditional on the state (closed/open) of the outlet, previously referred to as the first and the second state of the capsule, i.e. the inner membrane being intact and pierced or cut, respectively. Opening the outlet in step (b) transfers the capsule from the first to the second state.

Performing the method as described with a premixing step (a) significantly improves mixing results. This can be understood in analogy to kneading a predough with only a little amount of liquid, which increases a wetting of the powder and avoids a forming of lumps. Thus the resulting beverage is more homogeneous and more appetizing.

The premixing step (a) preferably comprises the steps of piercing a top membrane of the capsule sealing an inlet of the cavity by an injection needle and supplying water into the cavity of the capsule, and premixing the powder and the water inside the cavity through a forward and backward rotation of an agitator comprised in the cavity. In particular the supply of water and the rotation may be performed intermittently, and simultaneously or alternatingly. In an embodiment, the injection needle is part of the apparatus, and may be moved vertically by user interaction through pressing a lever, or it may be moved hydraulically or by a servo motor. An amount of water supplied during the premixing step (a) is limited by a volume of a cavity inside the capsule containing the powder. The forward and backward rotation being performed stepwise and repeatedly improve the distribution of the water as well as the wetting of the powder.

The cutting and/or piercing step (b) preferably comprises the step of piercing and/or cutting an inner membrane of the capsule with a blade element attached to the agitator through an axial movement of the agitator from an upper to a lower axial position and a simultaneous rotation of the agitator, as described above with respect to the capsule and the apparatus. In particular the axial movement may be reversed and repeated, which improves a cutting result, and makes sure that the inner membrane is actually cut and the outlet is open, even in case of a failure at a first try.

The mixing step (c) preferably comprises the steps of supplying more water into the capsule, and mixing the powder and the more water inside the capsule through a rotation of the agitator, which rotation is faster than a rotation in the premixing step (a). During the mixing step (c), water may be supplied continuously. In connection with the rotation of the agitator, this leads to a high degree of drainage of the capsule and only small amounts of wasted powder. For that purpose, the rotation in the mixing step (c) may spin the agitator at 100 to 1000 rpm, and in particular at 500 rpm.

In an embodiment, an additional bypass water supply step may be intercalated before the premixing step (a). In the bypass water supply step, water is supplied directly into the drinking container without being in contact with the powder. In different embodiments, the water may flow through a bypass in the capsule before it enters the drinking container, or it may directly be supplied from the apparatus into the drinking container. The bypass water supply step was found to increase mixing results and homogeneity of the resulting beverage.

BRIEF DESCRIPTION OF THE DRAWINGS

The embodiments defined above and further aspects, features and advantages of the present invention can also be derived from the examples of embodiments to be described hereinafter and are explained with reference to the drawings. In the drawings, it is illustrated in FIG. 1 a perspective exploded view of a capsule according to an embodiment of the present invention, FIG. 2 another exploded view of the capsule according to an embodiment of the present invention, FIG. 3 a cut through a capsule according to an embodiment of the present invention, FIG. 4 a diagram of certain parameters over time implementing a method according to an aspect of the present invention.

DETAILED DESCRIPTION OF THE DRAWINGS

Figure 3:
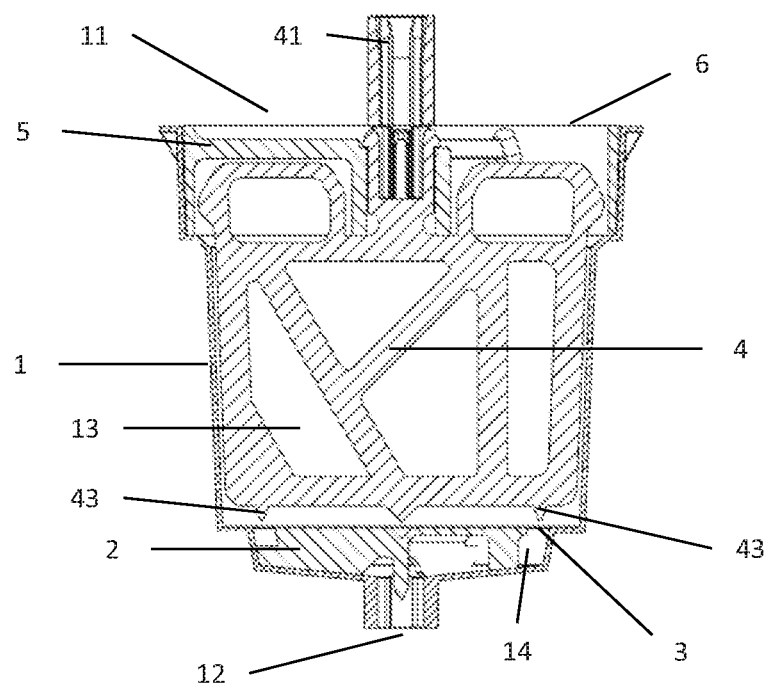

FIGS. 1 and 2 show exploded views of a capsule according to an embodiment of the present invention, wherein FIG. 1 is a perspective view, and FIG. 2 is a side view on the different elements of the capsule.

A housing 1 of the capsule comprises an inlet 11 and an outlet 12. A side of the housing 1 on which the outlet 12 is located shall be defined as bottom side. Preferably the housing 1 is cylindrical and/or conical in shape, and made of plastic or aluminium. Material and shape of the housing 1 preferably ensure a good storage quality of the powder, and to sustain pressures occurring during a preparation of the beverage.

The housing 1 comprises a cavity 13 for containing powder for preparing a beverage. A bottom of the cavity 13 is formed by an inner membrane 3, which preferably is an aluminium or metal foil, and preferably is glued into the housing 1. The inner membrane 3 separates the cavity 13 from another cavity 14 located between the inner membrane 3 and the outlet 12. The other cavity 14 is empty when the capsule is in a first state characterized by the inner membrane 3 being intact, i.e. the outlet 12 being closed.

Inside the other cavity 14, there is an insert 2, preferably also made from plastic. The insert 2 acts as a support for the inner membrane 3, and protects it from being damaged while the capsule is in the first state. Moreover the insert 2 is formed in such a way as to improve a mixing of the powder and water, when a mixture is flowing through the other cavity towards the outlet in a second state of the capsule, which second state is defined by the inner membrane 3 being cut and/or pierced, i.e. the outlet 12 being open. A shape of the insert 2 may also contribute to forming a laminar outflow from the outlet, hence making the beverage more appealing for a user.

Inside the cavity 13, there is an agitator 4, preferably also made from plastic. The agitator 4 comprises a central shaft 41 for coupling to an external motor. Preferably the central shaft 41 comprises coupling means 44, which enable reversible coupling to a motor shaft.

Further the agitator 4 comprises at least one blade 42 attached to the central shaft 41. According to the definition that a blade 42 is a laminar element extending radially outward from the central shaft 41, the agitator 4 shown in FIGS. 1 and 2 comprises two blades 42 and 42' with an angular offset of 180°. The blades 42, 42' comprise a frame and several bars forming a lattice structure. The lattice structure differs between the first blade 42 and the second blade 42', hence making the agitator 4 asymmetric. The lattice structure of the blades 42, 42' makes rotating the agitator 4 in the powder easier, while the asymmetry leads to an improved wetting and mixing of powder with water, especially during premixing when the capsule is in the first state.

The blades 42, 42' comprise blade elements 43 for piercing and/or cutting the inner membrane 3, transferring the capsule to the second state. For that purpose, the central shaft 41 is pivoted in a bearing 5 comprised in the capsule. The bearing 5 may include a ring, preferably made from plastic, fixed in the upper part of the housing 1. The bearing 5 is configured to allow rotation as well as an axial shift of the central shaft 41 between an upper and a lower axial position. The axial shift of the agitator 4 enables controlling different operating steps, namely a premixing step, an opening step, and a mixing step. The states of the capsule as well as the different operation phases may be understood in more detail from FIGS. 3 and 4.

FIG. 3 shows a cut through a capsule according to an embodiment of the present invention. The capsule again comprises a housing 1 with an inlet 11, an outlet 12, a cavity 13 for containing powder, and a second cavity 14 with an insert 2 below an inner membrane 3. Further the capsule comprises an agitator 4 pivoted in a bearing 5, and a top membrane 6. The top membrane 6 seals the inlet 11, is preferably an aluminium or plastic foil, and typically is sealed or glued or welded onto the housing 1.

For preparing a beverage, the capsule is inserted into a capsule holder of a corresponding apparatus. The top membrane 6 is pierced by one or more injection needles of the apparatus, located e.g. at half radius of the top membrane 6. Preferably at the same time, the central shaft 41 of the agitator 4 is coupled to the motor shaft of the apparatus, while the agitator 4 stays in the upper axial position. For premixing, water is supplied into the capsule, and the agitator 4 is rotated, while the capsule is still in the first state, i.e. the cavity 13 is sealed against the outlet 12. It is advantageous that the rotation during premixing is performed stepwise, and in both directions backward and forward, in order to achieve sufficient wetting of the powder.

In the opening step, the agitator 4 is shifted axially to the lower axial position, which results in a piercing of the inner membrane 3 through the blade elements 43. If the agitator 4 is rotated at the same time, the inner membrane 3 is rather cut than pierced, and a circular passage is formed between the cavity 13 originally containing the powder and the originally empty other cavity 14. It is advantageous that the agitator 4 rotates at a high speed, e.g. 100 to 1000 rpm, and in particular 500 rpm, already before the axial shifting, in order to achieve a reliable and clean cutting. Also, it is preferred to repeat the axial shift of the agitator 4 to ensure that the inner membrane 3 is actually cut. After cutting, the capsule is in the second state, i.e. the outlet is open.

During the mixing step, more water is supplied into the capsule and the agitator 4 rotates at high speed. In that way, powder and water are well mixed, and flow as a homogeneous solution through the other cavity 14 and the outlet 12 into a drinking container, such as a glass or a bottle. As a result, the capsule is emptied from the powder to a high degree, and the user is provided with an appetizing beverage in the drinking container.

Figure 4:
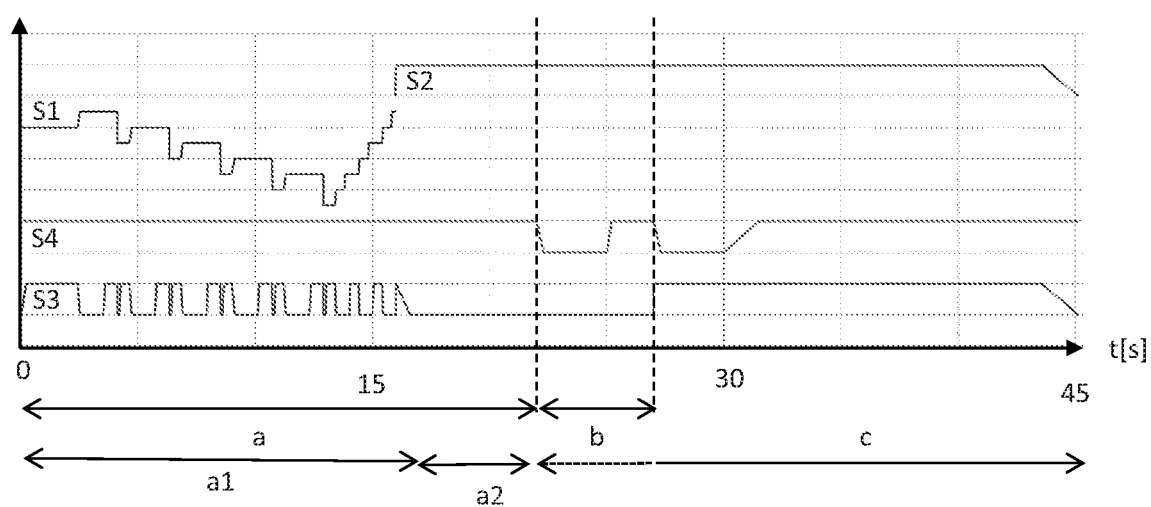

FIG. 4 displays a diagram of certain parameters over time in seconds implementing a method according to an aspect of the present invention. The displayed parameters are an angular position S1 of the agitator 4 during a first time interval, a rotation speed S2 of the agitator 4 during a later time interval, a switching of the water supply S3, and an axial position of the agitator S4. The method comprises three main steps: premixing (a), opening (b), and mixing (c), wherein the opening and mixing steps (b) and (c) may overlap.

In a first interval (a1) of premixing (a), water is supplied into the capsule in a pulsed manner, see parameter S3. The total amount of water supplied during the first interval (a1) of the premixing step (a) is limited by a volume of the cavity 13 and an amount of powder contained in the cavity 13. The agitator 4 is rotated forward, preferably only for a half or a full turn, also in a pulsed manner, see parameter S1. While the pulses of supplied water continue, the agitator 4 is rotated backward and forward in a pulsed manner. Following this procedure improves a wetting of the powder by creating new pathways for the water, resulting in a well wetted, viscous predough. In a subsequent second interval (a2) of the premixing (a), the agitator 4 starts rotating continuously in one direction at a high speed, e.g. at 500 rpm, see parameter S2, making the predough more homogeneous, while in this second interval (a2) no more water is supplied, see parameter S3.

The opening step (b) begins with an axial shift of the agitator 4 from the upper to the lower axial position, see parameter S4. At high rotation speed, the agitator 4 then pierces and cuts the inner membrane 3, thus opening a passage for the mixture to the outlet 12. In consequence, the mixture gradually flows out from the capsule. According to FIG. 4, the axial downward shift is repeated once before returning to the upper axial position, which ensures reliable cutting of the inner membrane 3.

By definition, the mixing step (c) starts when the inner membrane 3 is cut, and the mixture is free to flow out of the capsule. During the mixing step (c), more water is supplied continuously into the capsule, see parameter S3, while the agitator rotates at high speed, see parameter S2. This leads to a high degree of drainage of the capsule and only little amounts of wasted powder.

The entire preparation time can be estimated from the time scale in seconds. The duration of the individual steps are preferred variants only, and vary subject to the powder used, or subject to other parameters.

The invention claimed is:

1. A capsule configured to prepare a beverage, the capsule comprising
    a housing with an outlet, and a cavity configured to contain a powder;
    an inner membrane between the cavity and the outlet; and
    an agitator, comprising a central shaft, and at least two blades attached to the central shaft,
        the at least two blades comprising at least one blade element configured for one or more of piercing and cutting the inner membrane, and
        the at least two blades having differing lattice structures, each lattice structure comprising a frame with bars reaching from one side of the frame towards a different side of the frame.

2. The capsule according to claim 1, comprising a top membrane for sealing an inlet of the housing.

3. The capsule according to claim 1, comprising a bearing for the central shaft of the agitator, the bearing being configured to enable a shift of the agitator between an upper and a lower axial position,
    a top end of the central shaft being pivotable in the bearing.

4. The capsule according to claim 1, the housing comprising another cavity between the inner membrane and the outlet.

5. The capsule according to claim 4, comprising an insert in the another cavity,
    the insert being configured to enable pivoting of a bottom end of the agitator when the agitator is in a lower axial position, and
    the insert being configured to prevent piercing of the inner membrane, when the agitator is in an upper axial position.

6. The capsule according to claim 1, the cavity being configured to contain at least 15 grams of the powder for preparing the beverage.

7. The capsule according to claim 1, one or more of the housing, the agitator, an insert, and a bearing for the central shaft of the agitator being made of plastic.

8. The capsule according to claim 1, one or more of the inner membrane and a top membrane for sealing an inlet of the housing being a plastic foil or an aluminium foil.

9. A capsule configured to prepare a beverage, the capsule comprising:
- a housing with an outlet, and a cavity configured to contain a powder;
- an inner membrane between the cavity and the outlet; and
- an agitator, comprising a central shaft and at least one blade attached to the central shaft,
  - the at least one blade comprising at least one blade element configured for one or more of piercing and cutting the inner membrane, and
  - the at least one blade further comprising a lattice structure, the lattice structure comprising a frame with bars reaching from one side of the frame to a different side of the frame.

10. An apparatus in combination with a capsule for preparing a beverage, the apparatus comprising:
- a capsule holder receiving the capsule, the capsule comprising:
  - a housing with an outlet, and a cavity for containing a powder;
  - an inner membrane between the cavity and the outlet; and
  - an agitator, comprising a central shaft, and at least two blades attached to the central shaft,
    - the at least two blades comprising at least one blade element for one or more of piercing and cutting the inner membrane, and
    - the at least two blades having differing lattice structures, each lattice structure comprising a frame with bars reaching from one side of the frame towards a different side of the frame;
- the apparatus further comprising:
- a water supply configured to supply water to the capsule;
- a motor configured to drive the agitator of the capsule; and
- a control unit configured to control the water supply and the motor,
  - the water supply comprising an injection needle configured to pierce a top membrane of the capsule and supply water into the cavity of the capsule.

11. The apparatus in combination with the capsule according to claim 10, the motor being configured to drive a motor shaft, which is configured to couple to the central shaft of the agitator,
- the motor shaft, or the motor shaft and the motor being shiftable in an axial direction between an upper and a lower axial position,
- the shift between the upper and the lower axial position being controlled by the control unit.

12. The apparatus in combination with the capsule according to claim 10, wherein the capsule comprises the top membrane for sealing an inlet of the housing.

13. The apparatus in combination with the capsule according to claim 10, wherein the capsule comprises a bearing for the central shaft of the agitator, the bearing being configured to enable a shift of the agitator between an upper and a lower axial position,
- a top end of the central shaft located next to an inlet being pivotable in the bearing.

14. The apparatus in combination with the capsule according to claim 10, wherein the housing comprises another cavity between the inner membrane and the outlet.

15. The apparatus in combination with the capsule according to claim 10, wherein the capsule comprises an insert in another cavity,
- the insert being configured to enable pivoting of a bottom end of the agitator located next to the outlet, when the agitator is in a lower axial position, and
- the insert being configured to prevent piercing of the inner membrane, when the agitator is in an upper axial position.

16. A method for preparing a beverage, comprising the steps of:
(a) premixing a powder and water inside a cavity of a capsule, while an outlet of the capsule is sealed against the cavity by an inner membrane,
- the capsule comprising:
  - a housing with the outlet, and the cavity configured to contain the powder;
  - the inner membrane between the cavity and the outlet; and
  - an agitator, comprising a central shaft, and at least two blades attached to the central shaft,
    - the at least two blades comprising at least one blade element configured for one or more of piercing and cutting the inner membrane, and
    - the at least two blades having differing lattice structures, each lattice structure comprising a frame with bars reaching from one side of the frame towards a different side of the frame;
(b) one or more of piercing and cutting the inner membrane previously sealing the outlet; and
(c) supplying more water into the capsule, and mixing the powder and the more water inside the capsule, when the outlet is accessible from the cavity, a resulting mixture flowing out from the outlet.

17. The method according to claim 16, the pre-mixing step (a) comprising the steps of:
- piercing a top membrane of the capsule sealing an inlet of the capsule by an injection needle and supplying the water into the cavity; and
- premixing the powder and the water inside the cavity through a forward and backward rotation of the agitator,
- the supply of water and the rotation being performed non-continuously, and simultaneously or alternatingly.

18. The method according to claim 16, the step (b) of one or more of the piercing and the cutting of the inner membrane comprising the step of:
- cutting the inner membrane with the at least one blade element through an axial movement of the agitator from an upper to a lower axial position and a simultaneous rotation of the agitator, and
- the axial movement being reversed and repeated.

19. The method according to claim 16, the mixing step (c) comprising the step of:
- the mixing of the powder and the more water inside the capsule through a rotation of the agitator, which rotation is faster than a rotation in the premixing step (a),
- the rotation in the mixing step (c) spinning the agitator at 100 to 1000 revolutions per minute (rpm).

* * * * *